3,217,026
REMOVAL OF METALS AND COLOR FROM
POLYMERIC SECONDARY AMINES
Leonard R. Vertnik and Craig W. Brammer, Minneapolis,
Minn., assignors to General Mills, Inc., a corporation of
Delaware
No Drawing. Filed Feb. 2, 1962, Ser. No. 170,778
11 Claims. (Cl. 260—464)

This invention relates to a process for treating polymeric secondary amines. More particularly, it relates to a process for removal of metals and color from such amines by the use of acid clays and aqueous ammonium hydroxide.

In the copending application of Leonard R. Vertnik, Serial No. 136,426, filed September 7, 1961, are disclosed and claimed polymeric secondary amines characterized by the recurring structural unit:

$$[-N-CH_2-D-CH_2-]$$
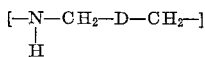

where D is a dimeric fat radical. These polymers are prepared by the condensation polymerization of a fatty dinitrile derived from a dimerized fat acid. In addition to the homopolymer products prepared by the homo-condensation of a fatty dinitrile, copolymer products are prepared by the condensation copolymerization of a fatty dinitrile and a dinitrile copolymerizable therewith.

The condensation polymerization of the fatty dinitriles is accomplished by hydrogenating a fatty dinitrile under secondary-amine-forming conditions. By "secondary-amine-forming conditions" is meant that set of hydrogenation conditions under which a fatty nitrile preferentially forms a secondary amine rather than a primary amine. Secondary fatty amines derived from monobasic fatty acids are commercially available products and the conditions necessary to produce them are well understood in the art. Typical reaction conditions utilize hydrogen pressures in the range of 25 to 1000 p.s.i.g. at temperatures in the range of 200 to 290° C.

The preparative reaction is illustrated by the following equation:

$$NC-D-CN \xrightarrow[\text{Cat.}]{H_2} H-[-N-CH_2-D-CH_2-]_x-NH_2 + NH_3$$
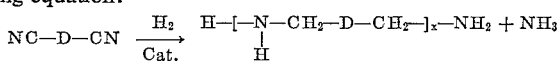

where D is a dimeric fat radical and $x$ is the number of recurring units in the polymer chain. $x$ is normally at least 2 and can be as high as 40 or greater. As illustrated in the equation, an ammonia by-product is formed. In order to obtain optimum yields of the desired polymer product, the ammonia by-product is removed. Generally this is done by "sweeping" the reaction mixture with hydrogen gas.

The dinitrile starting materials for preparing the polymers of the above-described Vertnik application are the dinitriles prepared from dimerized fat acids. Relatively pure dimerized fat acids can be distilled from commercially available polymeric fat acid mixtures. The term "polymeric fat radical" as used herein and in said prior application refers to the hydrocarbon radical of a polymeric fat acid. The term "polymeric fat acid" refers to a polymerized fat acid. The term "fat acid" refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to as "dimeric fat radical" and "trimeric fat radical."

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight chain acids such as caprylic, pelargonic, capric, lauric, myristic, palmitic, isopalmitic, stearic, arachidic, behenic and lignoceric.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, mono- and polyethylenically unsaturated acids such as 3-octenoic, 11-dodecenoic, linderic, lauroleic, myristoleic, tsuzuic, palmitoleic, petroselinic, oleic, elaidic, vaccenic, gadoleic, cetoleic, nervonic, linoleic, linolenic, eleostearic, hiragonic, moroctic, timnodonic, eicosatetraenoic, nisinic, scoliodonic and chaulmoogric.

The acetylenically unsaturated fat acids can be polymerized by simply heating the acids. Polymerization of these highly reactive materials will occur in the absence of a catalyst. Acetylenically unsaturated acids occur only rarely in nature and are expensive to synthesize. Therefore, they are not currently of commercial significance. Any acetylenically unsaturated fat acid, both straight chain and branched chain, both mono- and polyunsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acid are the preferred starting materials for the preparation of the polymeric fat acids.

The dimerized fat acid is converted to the corresponding dinitriles by reacting the dimerized fat acid with ammonia under nitrile forming conditions. The details of this reaction are set forth in chapter 2 of "Fatty Acids and Their Derivatives" by A. W. Ralston, John Wiley & Sons, Inc., New York (1948). If desired, the dinitrile may then be purified to the desired degree by vacuum distillation or other suitable means. Generally, the high purity dinitrile tends to produce linear polymers of high molecular weight. If appreciable amounts of mononitrile are present, the polymer will be of low molecular weight, since these materials act as chain-stoppers. The presence of tri-nitriles and other higher polyfunctional nitriles tends to produce a cross-linked polymer. A sufficient amount of tri-nitriles will provide a gelled product.

Copolymers are prepared by copolymerizing mixtures of dinitriles. The desired dinitrile comonomer is added to the reaction mixture along with the fatty dinitrile. After subjecting the mixture to polymerization conditions, there is obtained a copolymer having randomly distributed recurring units:

$$[-N-CH_2-D-CH_2-]$$
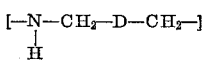

and $$[-N-CH_2-R_c-CH_2-]$$
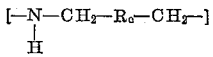

where D is a dimeric fat radical and $R_c$ is a divalent radical derived from the comonomer dinitrile. Generally, any copolymerizable dinitrile can be employed. Specific examples of simple nitriles which can be employed as comonomers include the dinitriles derived from such acids as adipic, pimelic, suberic, azelaic and sebacic. When such illustrative dinitriles are used, $R_c$ is a saturated divalent aliphatic hydrocarbon radical of 4 to 8 carbon atoms. Mixtures of two or more fatty dinitriles can also be copolymerized. A large variety of other dinitriles are likewise useful.

In theory, the formation of the polymeric amine proceeds through the preliminary reduction of the dinitrile to the di-primary amine, $H_2N-CH_2-D-CH_2-NH_2$, followed by conversion of the di-primary amine to the polymeric secondary amine. Accordingly, this provides an alternate route for the preparation of the polymers. In the alternate route, the di-primary amines are formed separately and then converted to the polymeric amines under the conditions previously described, although it is possible to use somewhat milder conditions. In this instance, it is possible to use a variety of other diamines as comonomers including some comonomers such as metaxylene diamines which may not be readily employed in the form of nitriles. And from a practical standpoint, there may be certain advantages in thus carrying out the preparation of the polymeric amines in two steps since it makes possible the removal of any by-products formed in the first step, i.e., the formation of the di-primary amine, and thus enhances the purity of the final product. In addition, the milder conditions used to form the polymeric amine from the di-primary amine results in less degradation and thus further enhances the purity of the final product.

Generally, the end groups of the polymers are either amine groups or nitrile groups. Where the polymers are prepared by condensing amines, all the end groups will be primary amines:

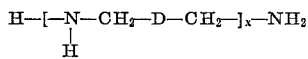

where D and x are as previously defined. Where a dinitrile is used as the starting material and the reaction conditions are mild and the reaction time is short, the end groups will be mainly nitrile groups:

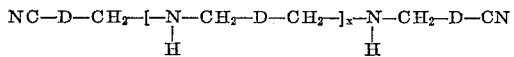

wherein D and x are as previously defined. When dinitriles are used as the starting material, under many reaction conditions a mixture of polymers will be obtained, some chains terminating in nitrile groups and other chains terminating in amine groups. Where severe reaction conditions are utilized, the degradation of functional groups may cause some chains to terminate in hydrocarbon groups.

A hydrogenation catalyst is employed to carry out the polymerization reaction. Generally, any nitrile hydrogenation catalyst can be employed. Preferred catalysts are Raney nickel and copper-chromite catalysts. Other suitable catalysts include Raney cobalt, platinum, palladium, palladium on charcoal, platinum on charcoal, nickel on kieselguhr, copper-nickel carbonate, cadmium-copper-zinc chromite, copper-nickel oxide and the like.

The "copper-chromite catalyst" referred to above is often referred to as "copper-chromium oxide catalyst." Preparation of copper-chromite catalysts is discussed in an article by Connor, Folkers, and Adkins, in the "Journal of the American Chemical Society," vol. 54, pages 138–45 (1932), and in "Reactions of Hydrogen with Organic Compounds Over Copper-Chromium Oxide and Nickel Catalysts" by Homer Adkins, University of Wisconsin Press, Madison, Wisconsin (1937). The nature of this catalyst is further discussed in an article by Adkins, Burgoyne, and Schneider in the "Journal of the American Chemical Society," vol. 72, pages 2226–29 (1950). Commercially available copper-chromite catalysts often contain amounts of catalyst stabilizers, e.g., barium oxide, calcium oxide, and magnesium oxide. Catalysts containing such stabilizers can be employed to prepare the polymer products if desired. While many types of copper-chromite catalysts are commercially available and are generally useful, those containing 40 to 65% CuO (assuming all copper is present as CuO) and 35 to 60% $Cr_2O_3$ (assuming all chromium to be present as $Cr_2O_3$) are preferred.

The amount of catalyst employed is not critical. Generally, catalyst in the amount of 1 to 10% by weight, based on the weight of the nitrile charge, is sufficient for most purposes. Larger and smaller amounts of catalysts can be employed, however, if desired.

As indicated in the prior Vertnik application, the molecular weight and other properties of the polymer product vary depending on the type of catalyst employed and the reaction conditions used. For many applications, it is desirable to have polymer products which are light in color and essentially metal free. Such porducts can be prepared by polymerizing the dinitriles or diamines using mild reaction conditions and Raney nickel catalysts. However, polymeric secondary amines prepared by using copper and/or chromium containing catalysts are dark in color and contain small, but significant, amounts of metal contaminants even after filtration.

It is an object of this invention to provide a process for removal of metals and color from polymeric secondary amines prepared by the condensation polymerization of fatty dinitriles or diamines derived from dimerized fat acids using copper and/or chromium containing catalysts. Another object of the invention is to provide such a process using acidic clays and aqueous ammonium hydroxide. Other objects, features and advantages will be apparent from the following description of our invention.

Broadly, our invention comprises the treatment of the above-described polymeric secondary amines which are dark in color and contain metal contaminants with an acid clay and aqueous ammonium hydroxide. The amine is first admixed with the clay and then an aqueous solution of ammonium hydroxide is added to the clay-amine mixture with stirring. The resulting mixture is allowed to settle into an upper, very pale yellow organic layer and a lower, dark colored aqueous layer containing the clay. The organic phase is then separated from the aqueous phase by any suitable means such as by decantation. The organic phase can be filtered to remove any occluded water and other filterable materials. We have found that it is necessary to use both the acid clay and aqueous ammonium hydroxide to achieve the desired color improvement and removal of metal contaminants. Also, it is necessary to use acid clays and not alkaline clays and the clay must be present during the ammonium hydroxide treatment.

Any acid clay can be used in the process of the present invention. Thus, naturally occurring acidic clays can be used as well as those prepared by treating naturally occurring neutral or alkaline clays with an inorganic acid such as hydrochloric acid.

It is preferred to use dilute aqueous ammonium hydroxide solution in our process. Thus, aqueous solutions containing about 4 to 12% by weight ammonium hydroxide are highly suitable. More concentrated solutions (i.e., 28% $NH_4OH$) can be used in some cases. However, in most instances no particular advantage is obtained by the use of the concentrated solutions since the reaction mixture would then normally have to be diluted with additional water.

The amount of clay and ammonium hydroxide used will vary widely depending upon the particular polymeric secondary amine being treated, the color thereof and the amount of metal contaminants contained therein. Generally, the clay will be used in an amount of about 3 to 10% by weight based on the weight of the amine being treated. The ammonium hydroxide (100% basis) is generally used in amounts of about 10 to 20% by weight, and preferably 15% by weight, based on the weight of the amine.

The polymeric secondary amine is preferably treated in the form of a 10 to 50% by weight solids solution. Suitable solvents include alcohols and hydrocarbons. A particularly suitable solvent is a 50/50 butanol-toluene solution. The clay is added to the amine-solvent solution with stirring and if desired with slight heating—i.e., to 50° C. for example. The stirring is continued for a period of from a few minutes to a few hours. Thereafter, the aqueous solution of ammonium hydroxide is gradually added to the clay-amine-solvent mixture with stirring. Again the mixture is stirred for an additional period of time, such as for ½ to 3 hours. The mixture is then allowed to separate into an upper, almost clear, very pale yellow layer and a lower, darker colored aqueous alkaline layer containing the clay, metal contaminants and color bodies. The aqueous phase can then be drawn off or the organic phase can be decanted from the aqueous phase. If desired, or necessary, the organic phase can be filtered through a filter-aid to remove any occluded water and other filterable materials (e.g., any suspended clay particles, etc.) If a solvent has been used, it can be wholly or partially stripped from the organic phase to provide the light colored polymeric secondary amine or any desired solids concentration of said amine in the solvent. The recovered solvent can be reused in the next treatment.

As a means of visible control, samples can be withdrawn from the reaction mixture at intervals during the gradual addition of the aqueous ammonium hydroxide solution and the rate of settling, separation and degree of color improvement and metal removal can be observed. Aqueous ammonium hydroxide is added until the samples show the desired degree of improvement.

The following examples serve to illustrate the present invention without, however, limiting the same thereto:

Example I

Into a 70 gallon pilot plant hydrogenation autoclave were charged 250 pounds of distilled dimeric fat dinitrile prepared from dimerized fat acids consisting essentially of a mixture of dimerized linoleic and oleic acids and 12.5 pounds of a commercially available copper-chromite catalyst "G-13." The autoclave was flushed with hydrogen, sealed under 150 p.s.i.g. hydrogen and rapidly heated to 220° C., at which time a continuous venting of hydrogen was begun. The hydrogenation was then run at 225–230° C. for a period of 5 hours and the pressure of the circulating hydrogen was 200 p.s.i.g. The reaction mixture was cooled to about 200° C. and then a 50/50 mixture of butanol and toluene was pumped into the autoclave to give an approximately 30% solids solution. The 30% solids solution was filtered to remove catalyst. The product (on a 100% solids basis) had the following analysis:

| | |
|---|---|
| Primary amine groups | 6.8%. |
| Secondary amine groups | 82.5%. |
| Tertiary amine groups | 4.9%. |
| Brookfield viscosity | 675 poises at 60° C. |
| Amine equivalent wt. | 545. |
| Molecular wt. (end group analysis) | 8300. |
| Color | Almost black. |
| Copper | ≅8,000 p.p.m. |
| Chromium | ≅1,000 p.p.m. |

Example II

To 500 g. of the 30% solids amine solutions of Example I was aded 500 g. of a 50/50 mixture of butanol and toluene. The resulting 15% solids solution was mixed with 7.5 g. of Filtrol Grade I (an acid activated mineral montmorillonite clay) and then warmed slightly (to about 50° C.) over a period of 30 minutes with stirring. Two hundred eighty grams of an 8.7% aqueous ammonium hydroxide solution was gradually added, with stirring, to the clay-amine-solvent mixture. The stirring was continued for about 30 minutes and then the mixture was allowed to separate into an almost clear, very pale yellow organic layer and a lower, blue, aqueous alkaline layer. The aqueous phase was drawn off and then the organic phase was filtered. The product had substantially the same primary, secondary and tertiary amine group contents, molecular weight, viscosity and equivalent weight as the amine of Example I, but contained only 52 p.p.m. copper and 115 p.p.m. chromium.

Example III

The procedure of Example II was repeated on a pilot plant batch basis. In this example 300 pounds of the 15% solids amine solution was treated with 2.25 pounds of Filtrol Grade I and 86 pounds of an 8.4% aqueous ammonium hydroxide solution. The reactants were admixed, stirred and separated in the same manner as set forth in Example II. There was obtained an amber colored product containing (on a 100% solids basis) only 32 p.p.m. copper and 129 p.p.m. chromium. The other properties of the treated amine were substantially the same as those of the amines of Examples I and II.

Example IV

Example II was repeated except that the clay was filtered from the amine-solvent solution before addition of the ammonium hydroxide. No desired color improvement or metal removal was achieved.

Examples V and VI

Example II was repeated except that no clay was used in Example V and no aqueous ammonium hydroxide was used in Example VI. Again there was no removal of color bodies or metals from the amine.

Example VII

Example II was repeated except that 7.5 g. of an alkaline clay was used instead of the acid activated clay. There was no improvement in color or metal removal. This example was repeated using 75 g. of the alkaline clay. A slight color improvement was achieved.

It is to be understood that the invention is not to be limited to the exact details of operation or the exact processes shown and described, as obvious modifications and equivalents will be apparent to those skilled in the art and the invention is to be limited only by the scope of the appended claims.

We claim:

1. A process for improving the color of a polymeric secondary amine which comprises: (1) contacting the polymeric secondary amine with about 3 to 10% by weight based on the weight of the amine of an acid clay selected from the group consisting of naturally occurring acidic clays, naturally occurring neutral clays acidified with an inorganic acid and naturally occurring alkaline clays acidified with an inorganic acid and about 10 to 20% ammonium hydroxide based on the weight of the amine, said ammonium hydroxide being used in the form of an aqueous solution thereof and said polymeric secondary amine having been prepared by hydrogenating a compound selected from the group consisting of fatty dinitriles of the formula

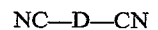

and aliphatic diprimary diamines of the formula

where D is the divalent hydrocarbon radical of a dimerized fat acid prepared from a fat acid of 8 to 24 carbon atoms, said hydrogenation having been carried out using a catalyst containing at least one metal selected from the group consisting of copper and chromium, a hydrogenation pressure in the range of 25 to 1000 p.s.i.g. and a temperature in the range of 200 to 290° C. while sweeping the reaction mixture with hydrogen gas to remove by-product ammonia; and (2) recovering the improved polymeric secondary amine from the acid clay and aqueous ammonium hydroxide solution.

2. A process according to claim 1 wherein the polymeric secondary amine consists essentially of a polymer having the recurring structural unit:

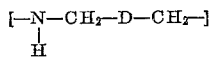

where D is the divalent hydrocarbon radical of the dimerized fat acid.

3. A process according to claim 1 wherein the polymeric secondary amine consists essentially of a polymer having the structure:

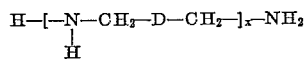

wherein D is the divalent hydrocarbon radical of the dimerized fat acid and $x$ is an integer in the range of 2 to 40.

4. A process according to claim 3 wherein D is the divalent hydrocarbon radical of dimerized linoleic acid.

5. A process according to claim 1 wherein the polymeric secondary amine consists essentially of a polymer having the structure:

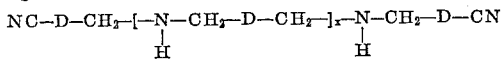

wherein D is the divalent hydrocarbon radical of the dimerized fat acid and $x$ is an integer in the range of 2 to 40.

6. A process according to claim 5 wherein D is the divalent hydrocarbon radical of dimerized linoleic acid.

7. A process according to claim 1 wherein the ammonium hydroxide is used in the form of a dilute aqueous solution containing about 4 to 12% by weight of the said ammonium hydroxide.

8. A process according to claim 1 wherein the polymeric secondary amine is in the form of a 10 to 50% solids solution in an organic solvent therefore.

9. A process according to claim 1 where the improved polymeric secondary amine is recovered (2) by allowing the reaction mixture to settle whereby an upper organic phase containing the polymeric secondary amine and a lower aqueous alkaline phase containing the acid clay are formed and then separating said organic phase from said aqueous phase.

10. A process for improving the color of a polymeric secondary amine which comprises: (1) contacting the polymeric secondary amine with about 3 to 10% by weight based on the weight of the amine of an acid clay selected from the group consisting of naturally occurring acidic clays, naturally occurring neutral clays acidified with an inorganic acid and naturally occurring alkaline clays acidified with an inorganic acid and about 10 to 20% ammonium hydroxide based on the weight of the amine, said ammonium hydroxide being used in the form of an aqueous solution thereof and said polymeric secondary amine having been prepared by hydrogenating a mixture of (a) an aliphatic dinitrile of the formula

where D is the divalent hydrocarbon radical of a dimerized fat acid prepared from a fat acid of 8 to 24 carbon atoms and (b) a copolymerizable aliphatic dinitrile of the formula

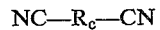

where $R_c$ is a saturated divalent aliphatic hydrocarbon radical of 4 to 8 carbon atoms, said hydrogenation having been carried out using a catalyst containing at least one metal selected from the group consisting of copper and chromium, a hydrogen pressure in the range of 25 to 1000 p.s.i.g. and a temperature in the range of 200 to 290° C. while sweeping the reaction mixture with hydrogen gas to remove by-product ammonia; and (2) recovering the improved polymeric secondary amine from the acid clay and aqueous ammonium hydroxide solution.

11. A process according to claim 10 wherein the polymeric secondary amine consists essentially of a copolymer having the randomly distributed recurring units:

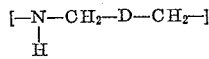

and

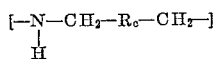

where D is the divalent hydrocarbon radical of the dimerized fat acid and $R_c$ is the saturated divalent aliphatic hydrocarbon radical of the copolymerizable aliphatic dinitrile.

References Cited by the Examiner
UNITED STATES PATENTS

| | | | |
|---|---|---|---|
| 2,177,619 | 10/39 | Nicodemus et al. | 260—464 |
| 2,435,553 | 2/48 | Bruson et al. | 260—465.8 |
| 3,010,782 | 11/61 | McCaleb et al. | 260—404.5 X |

CHARLES B. PARKER, *Primary Examiner.*

JOSEPH R. LIBERMAN, *Examiner.*